July 21, 1953 P. R. BELL, JR 2,646,502

NOISE LIMITING CIRCUIT

Filed Aug. 30, 1945

INVENTOR.
PERSA R. BELL JR.
BY
William D. Hall
ATTORNEY.

Patented July 21, 1953

2,646,502

UNITED STATES PATENT OFFICE 2,646,502

NOISE LIMITING CIRCUIT

Persa R. Bell, Jr., Cambridge, Mass., assignor, by mesne assignments, to the United States of America as represented by the Secretary of War Application August 30, 1945, Serial No. 613,606

1 Claim. (Cl. 250—27)

This invention relates generally to electrical circuits and more particularly to an automatic noise silencer circuit.

In certain types of radio receivers some stages may be blocked by strong incoming signals and made insensitive to signals below a certain level immediately following the strong signal. Blocking results from the flow of grid current during the period of the strong signal in any of the receiver stages and consequent charging up of the coupling capacitor in the grid circuit. The charging up effectively produces a negative bias on the stage which then leaks off exponentially. In the period during which the negative bias is leaking off, certain small signals immediately following the strong signal will not be amplified or even passed by the stage.

It is sometimes desirable to prevent certain strong incoming pulses from appearing in the receiver output. These noise signals may be of a random character and are commonly known as interfering signals. Since their phase may be varying, their reception may not be predictable.

It is desirable to not only prevent a receiver channel from blocking but to eliminate the undesirable strong interfering signals from the receiver output altogether.

It is an object of this invention to provide means for preventing the receiver channel from blocking during the reception of certain strong signals. Another object is to prevent the receiver channel from being made insensitive immediately following the reception of said certain strong signals. A further object is to prevent desirable signals from being attenuated excessively. Still another object is to provide means for allowing the circuit of this invention to react quickly in preventing the strong signals from appearing in the output of the receiver channel.

Other objects, features and advantages of this invention will suggest themselves to those skilled in the art and will become apparent from the following description of the invention taken in connection with the accompanying drawings in which.

Figure 1:
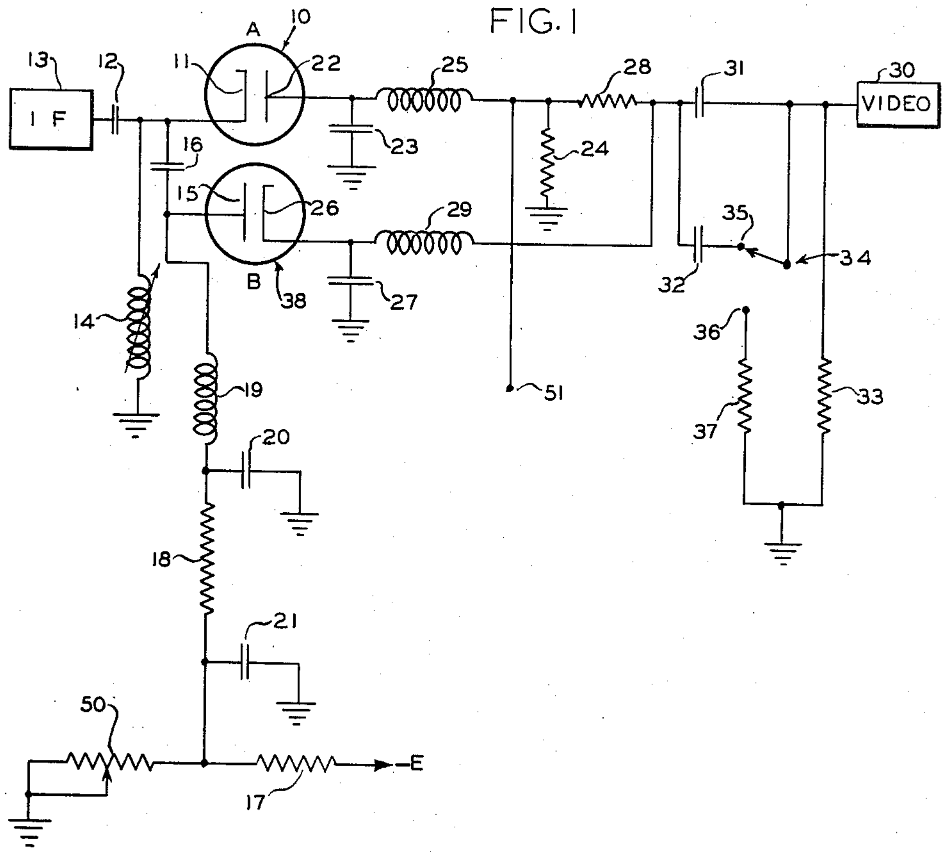
Fig. 1 shows a circuit diagram embodying the principles of this invention.

Referring more specifically to Fig. 1, there is shown a balanced video automatic noise silencer circuit hereafter referred to as an ANS circuit. The ANS circuit includes tubes 10 and 38 connected in opposition to each other as a double diode detector. Cathode 11 of detector 10 is connected through coupling capacitor 12 to an I.-F. stage 13 of the receiver channel. Cathode 11 is also connected through variable inductance 14 to ground and through coupling capacitor 16 to anode 15 of diode 38.

Variable resistor 50 in series with fixed resistor 17 provides a bleeder combination to ground for the negative supply voltage —E. A variable negative voltage from the common connection of variable resistor 50 and fixed resistor 17 is applied through fixed resistor 18 and choke 19 to plate 15 of diode 38. Condensers 20 and 21 are each connected from a different side of resistor 18 to ground to provide a filter network. Anode 22 of diode 10 is connected through by-pass capacitor 23 to ground, through choke 25 to load resistor 24 and thence to ground. Cathode 26 of diode 38 is by-passed to ground through capacitor 27, connected through choke 29 to series load resistors 28 and 24, and thence to ground.

The combined output of both detectors is taken from resistor 28 and applied to video stage 30 through parallel coupling capacitor 31 and 32 and grid resistor 33 when switch 34 connects with contact 35. When switch 34 connects with contact 36, capacitor 32 is disconnected and resistor 37 is connected in parallel with resistor 33.

In operation, the alternating I.-F. signal appears at both cathode 11 of diode 10 and anode 15 of diode 38. During the negative half cycle of the input signal, diode 10 conducts and a current flows through load resistor 24. The voltage developed across the load resistor tends to be maintained by the discharge of capacitor 23 through the resistance during the nonconducting half cycle. A negative pulse will appear across load resistor 24. Capacitor 23 together with choke 25 forms a filter to prevent the intermediate frequency from appearing in the video stages.

During the positive half cycle of the input signal diode 38 will conduct if the amplitude of that input signal is sufficient to overcome the negative bias applied to anode 15. The voltage developed across the load resistor 24 and 28 tends to be maintained by the discharge of capacitor 27 through the resistance during the nonconducting half cycle. A positive pulse will appear across load resistors 24 and 28. Capacitor 27 together with choke 29 forms a filter to prevent the intermediate frequency from appearing in the following video stages.

The ratio of the D.-C. voltage developed across the output of a diode detector to the peak amplitude of the applied carrier is called the efficiency of rectification of the carrier. The efficiency of rectification depends upon the ratio of the diode load impedance to the conduction resistance of the diode. When diode 38 operates the applied signal and its conduction resistance are the same as those for diode 10. However, its load resistance is larger and hence its efficiency will be greater than diode 10.

The signal pulse to the video amplifier increases as the R.-F. signal increases until the biased detector 38 begins to operate. In operation the efficiency of biased detector 38 will exceed that of diode detector 10. At this time, the signal to the video amplifier begins to decrease and becomes and remains nearly zero as the input to the detectors increases. Therefore when a signal pulse exceeds a certain chosen magnitude determined by the negative voltage applied to anode 15 of diode 38, the video output will be zero and the large trace representing the pulse will not appear on the cathode ray tube.

When a signal pulse fails to exceed the chosen magnitude, the detector 10 functions as in the conventional receiver second detector.

Figure 2:
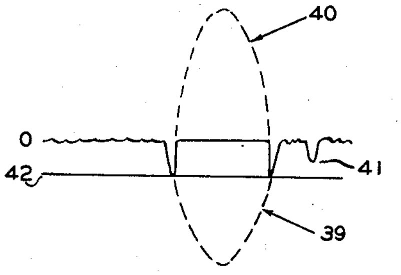
Fig. 2 shows a waveform which will be used in the explanation of the operation of this circuit.

Fig. 2 illustrates the operation of the ANS circuit. When a signal exceeding the level of the negative voltage, 42, applied to anode 15 of biased diode 38, is applied to both detectors, detector 10 will produce a pulse 39 at the output. Detector 38 will produce a pulse 40 at the output. The two pulses are equal and opposite when the input signal is of sufficient magnitude and hence they cancel each other except for small spikes at either end of the original pulse. Any desired target echo signal 41 immediately following the strong signal will now be in the receiver output.

The cathode and the anode of each detector may be interchanged. Then with a positive bias voltage applied to biased detector 38, the ANS circuit will effectively produce the same results as described above. In this case the polarity of the output pulses of each diode detector will be reversed.

An instantaneous automatic volume control voltage for receiver overload protection may be taken from a terminal 51 which is connected to load resistor 24.

If grid current is drawn in a stage of the video amplifier circuit due to an excessively large signal, the resulting negative bias may bias the video amplifier into a nonconducting region on cessation of the large signal. Capacitors 31 and 32 and resistors 33 and 37 form a simple R.-F. differentiating circuit between the detector and the video amplifier and reduce the damaging effects of grid current in the video amplifier stage.

The time constant of the diode load depends primarily upon the load resistor 24, shunt capacitor 23 and the diode capacitance. The time constant must be determined by a compromise between obtaining steep pulse edges, which requires a short time constant, and obtaining the largest possible envelope with minimum I.-F. component which 2 requires a long time constant.

The qualities of a good diode for use as a detector are a low diode capacitance as compared to the shunt capacitance 23 and a low conduction resistance as compared to load resistance 24.

When an input signal does not exceed the chosen magnitude, it will not be attenuated more than in a conventional diode detector circuit.

Hence desirable signal pulses are not reduced excessively in magnitude as they are detected in this circuit.

While there has been described hereinabove what is at present considered to be a preferred embodiment of this invention, it will be obvious to those skilled in the art that various changes and modifications may be made therein without departing from the scope of the invention as set forth in the appended claim.

What I claim is:

An automatic radio noise silencer circuit for use with a source of pulse-modulated alternating signals of variable amplitude, comprising a first and second diode, each of said diodes having a plate and a cathode, means for connecting said source of pulse-modulated alternating signals to the cathode of said first diode, a first capacitor having a negligible reactance at the frequency of said pulse-modulated alternating signals for connecting the cathode of said first diode to the plate of said second diode, a variable source of negative voltage, means for connecting said voltage to the plate of said second diode, first means for returning the plate of said first diode to said pulse-modulated alternating signal source, said first returning means including a first resistor, second means for returning the cathode of said second diode to said pulse-modulated alternating signal source, said second returning means including a second resistor in series with said first resistor, and coupling means for a signal translator including a third resistor connected in parallel with the input circuit of said signal translator, a second capacitor connected in series with said third resistor, means for connecting said serially connected third resistor and second capacitor across said serially connected first and second resistors, a switching means, a third capacitor, a four resistor, means for connecting said third capacitor in parallel with said second capacitor in a first position of said switching means, and means for connecting said fourth resistor in parallel with said third resistor in a second position of said switching means, said second capacitor and said third and fourth resistors forming a network having a time constant which is short relative to the duration of pulse signals applied thereto, and said second and third capacitors and third resistor forming a network having a time constant which is long relative to the duration of pulse signals applied thereto.

PERSA R. BELL, JR.

References Cited in the file of this patent

UNITED STATES PATENTS

| Number | Name | Date |
|---|---|---|
| 1,483,172 | Gannett | Feb. 12, 1924 |
| 1,915,926 | Dreyer, Jr. | June 27, 1933 |
| 2,161,764 | Minton | June 6, 1939 |
| 2,179,277 | Thompson | Nov. 7, 1939 |
| 2,227,197 | Percival | Dec. 31, 1940 |
| 2,247,324 | Travis | June 24, 1941 |
| 2,410,736 | Hoisington | Nov. 5, 1946 |
| 2,424,349 | Cawein | July 22, 1947 |
| 2,481,515 | Isbister | Sept. 13, 1949 |

OTHER REFERENCES

McCutchen & Griffin "The See-Saw Noise Silencer"; QST for July 1937, pages 13, 14, 56, 58 and 60.